US012779737B2

(12) United States Patent
Maruko

(10) Patent No.: US 12,779,737 B2
(45) Date of Patent: Nov. 3, 2026

(54) METHOD OF PRODUCING RECYCLED REINFORCING FIBERS

(71) Applicant: Miraikasei Inc., Chikuma (JP)

(72) Inventor: Haruna Maruko, Chikuma (JP)

(73) Assignee: MIRAIKASEI INC., Chikuma (JP)

( * ) Notice: Subject to any disclaimer, the term of this patent is extended or adjusted under 35 U.S.C. 154(b) by 656 days.

(21) Appl. No.: 18/267,460

(22) PCT Filed: Dec. 22, 2021

(86) PCT No.: PCT/JP2021/047695
§ 371 (c)(1),
(2) Date: Jun. 15, 2023

(87) PCT Pub. No.: WO2022/138764
PCT Pub. Date: Jun. 30, 2022

(65) Prior Publication Data

US 2024/0042651 A1 Feb. 8, 2024

(30) Foreign Application Priority Data

Dec. 23, 2020 (JP) ................................ 2020-213708

(51) Int. Cl.

| | |
|---|---|
| ***B29B 17/02*** | (2006.01) |
| ***D06M 11/13*** | (2006.01) |
| ***D06M 11/50*** | (2006.01) |
| ***D06M 11/55*** | (2006.01) |
| ***D06M 11/64*** | (2006.01) |
| ***D06M 11/70*** | (2006.01) |
| ***D06M 101/40*** | (2006.01) |

(52) U.S. Cl.
CPC ............. *B29B 17/02* (2013.01); *D06M 11/13* (2013.01); *D06M 11/50* (2013.01); *D06M 11/55* (2013.01); *D06M 11/64* (2013.01); *D06M 11/70* (2013.01); *B29B 2017/0293* (2013.01); *D06M 2101/40* (2013.01)

(58) Field of Classification Search
None
See application file for complete search history.

(56) References Cited

U.S. PATENT DOCUMENTS

| | | | |
|---|---|---|---|
| 2016/0052871 A1 | 2/2016 | Qin et al. | |
| 2017/0022636 A1* | 1/2017 | Goh ........................ | C03C 13/00 |
| 2017/0096540 A1 | 4/2017 | Goh et al. | |
| 2017/0157801 A1 | 6/2017 | Yang et al. | |
| 2019/0283279 A1 | 9/2019 | Kasai et al. | |

FOREIGN PATENT DOCUMENTS

| | | | |
|---|---|---|---|
| CN | 102391543 A | | 3/2012 |
| CN | 102731821 A | | 10/2012 |
| CN | 104592546 A | | 5/2015 |
| CN | 105906836 A | | 8/2016 |
| CN | 111171373 A | | 5/2020 |
| JP | H08157565 A | * | 6/1996 |
| JP | H11-109138 A | | 4/1999 |
| JP | 2000-034362 A | | 2/2000 |
| JP | 2016522843 A | | 8/2016 |
| JP | 2017-104847 A | | 6/2017 |
| JP | 2019-136932 A | | 8/2019 |
| JP | 2020-050704 A | | 4/2020 |
| KR | 20110047750 A | | 5/2011 |
| KR | 20170041114 A | | 4/2017 |
| WO | 2016177305 A1 | | 11/2016 |

OTHER PUBLICATIONS

Kim et al ("Enhanced and Eco-Friendly Recycling of Carbon-Fiber-Reinforced plastics Using Water at Ambient Pressure", ACS Sustainable Chem. Eng. (2020), 8, 2433-2440 published on Dec. 30, 2019) (Year: 2019).*
Machine Translation of Oura et al JPH08157565 (Year: 1996).*
International Search Report and Written Opinion mailed on Mar. 8, 2022, received for PCT Application PCT/JP2021/047695, filed on Dec. 22, 2021, 9 pages including English Translation.
The Second Office Action mailed Oct. 1, 2025, in Chinese Application No. 202180085700.3, 12 pages including English translation.
Notice of Reasons for Revocation mailed Oct. 28, 2024, in Japanese Application No. 2023700950, 78 pages including English translation.
Request for the Submission of an Opinion mailed Nov. 22, 2024, in Korean Application No. 10-2023-7024823, 11 pages including English translation.
Unitika Ltd. , "Chemical Resistance | Unitika Nylon 6 | Nylon Resin | Products | Unitika Plastics Division" [online]. Unitika Ltd., Japan, retrieved from the Internet: <https:/ /www.unitika.co.jp/plastics/products/nylon/uni-nylon6/un6-0304.html>, total 23 pages including English translation.
Notice of Reasons for Revocation issued in Japanese Patent Application No. 2022-567565 (Patent Opposition Objection No. 2023-700950) on Feb. 6, 2024, 66 pages. (with translation).
Masatoshi Kubouchi, "Corrosion/Degradation Behavior of Epoxy Resin Depend on Chemical Structure", Journal of the Adheshion Society of Japan, Nov. 1, 2010, vol. 46, No. 11, p. 423-428.
Masatoshi Kubouchi et al., "Decomposition of Amine Cured Epoxy Resin by Nitric Acid for Recycling", Materials (J. Soc. Mat. Sci.,Japan), May 15, 2000, Vo1.49, No. 5, p. 488-493.

(Continued)

*Primary Examiner* — Michael Forrest
(74) *Attorney, Agent, or Firm* — XSENSUS LLP

(57) ABSTRACT

Provided is a method of producing recycled reinforcing fibers capable of efficiently recovering reinforcing fibers, even with a solvent method, from a fiber-reinforced resin material comprising a resin component having a chemical structure with basic properties.

A method of producing recycled reinforcing fibers, the method including: a step of treating a fiber-reinforced resin material comprising a resin and reinforcing fibers with an acidic solution comprising an acid; and a step of treating the fiber-reinforced resin material with a treatment solution comprising an oxidizing agent to dissolve at least part of the resin of the fiber-reinforced resin material in the treatment solution, wherein the resin comprises a resin component having a chemical structure with basic properties.

8 Claims, No Drawings

(56) References Cited

OTHER PUBLICATIONS

Isamu Umeda et al., "Effect of Acid Addition in Nitric Acid Decomposition Recycling of Epoxy Resin", Proceedings of the 75th Annual Meeting of the Society of Chemical Engineers, p. 298.
Supplementary European Search Report mailed Jun. 7, 2024, in European Application No. 21910904.8, 5 pages.
Xu Pinglai et al: "Chemical recycling of carbon fibre/epoxy composites in a mixed solution of peroxide hydrogen and N, N-dimethylformamide", Composites Science and Technology, Elsevier, Amsterdam, NL, vol. 82, Apr. 18, 2013 (Apr. 18, 2013), pp. 54-59.
Lee Miyeon et al: "Fast chemical recycling of carbon fiber reinforced plastic at ambient pressure using an aqueous solvent accelerated by a surfactant", Waste Manegemant, Elsevier, New York, NY, US, vol. 118, Sep. 3, 2020 (Sep. 3, 2020), pp. 190-196.

* cited by examiner

METHOD OF PRODUCING RECYCLED REINFORCING FIBERS

CROSS REFERENCE TO RELATED APPLICATIONS

The present application is based on PCT filing PCT/JP2021/047695, filed Dec. 22, 2021, which claims the benefit of priority from Japanese Patent Application No. 2020-213708, filed Dec. 23, 2020 in Japan, the entire content of each is incorporated herein by reference.

TECHNICAL FIELD

The present invention relates to a method of producing recycled reinforcing fibers.

BACKGROUND ART

Fiber reinforced plastics (FRP) using fibers such as glass fibers as a reinforcing material are lightweight, high strength and high elasticity materials, and are widely used for members of small ships, automobiles, railway vehicles, and the like. In addition, carbon fiber reinforced plastics (CFRP) using carbon fibers as a reinforcing material have been developed for further reducing weight, increasing strength and increasing elasticity, and are used for members of aircraft, automobiles, and the like.

In recent years, the amount of fiber reinforced plastic waste has tended to increase, and the development of recycling technology is being studied. Methods for recovering reinforcing fibers from fiber reinforced plastics mainly comprise a pyrolysis method, in which a resin component is thermally decomposed and removed by heat treatment to thereby recover reinforcing fibers, and a solvent method, in which a resin component is dissolved in a solvent and removed to thereby recover reinforcing fibers. Among these methods, the solvent method is advantageous from the viewpoint of resource recycling since the resin component can be easily recovered.

Examples of the solvent method are proposed in PTLs 1 and 2. PTL 1 proposes a method of producing carbon fibers including: a step of immersing a carbon fiber composite material in an acidic aqueous solution to elute at least part of a resin component of the carbon fiber composite material to obtain a substantially fibrous material; and a step of immersing the substantially fibrous material in an alkaline aqueous solution to elute at least part of the resin component of the substantially fibrous material to obtain a fibrous material. Further, PTL 2 proposes a method of recovering carbon fibers including: a step of dissolving a base material of a carbon fiber reinforced plastic material using a solution containing phosphoric acid, wherein the solution has a phosphoric acid concentration of 110 mass % or more, and the step of dissolving is performed at a solution temperature of 200° C. or more and 300° C. or less.

CITATION LIST

Patent Literature

[PTL 1] JP 2019-136932 A
[PTL 2] JP 2020-50704 A

SUMMARY OF INVENTION

Technical Problem

However, in the conventional solvent methods, the efficiency of removing the resin component is not sufficiently high. And, according to the methods described in PTLs 1 and 2, the resin component is, for example, removed after the fiber-reinforced resin material is finely cut into chips of about several centimeters, in consideration of permeation of the treatment solution containing a solvent. When the fiber-reinforced resin material is finely cut as described above, the length of the recycled reinforcing fibers recovered from the fiber-reinforced resin material is inevitably shortened, whereby it becomes difficult to maintain the performance of the reinforcing fibers comprised in the fiber-reinforced resin material as it was before recovery and the applications of the recovered reinforcing fibers are limited. On the other hand, in order to efficiently remove the resin component by the solvent method, it is required to perform treatment for a long period of time under severe conditions such as high temperature.

In the solvent methods, the type of resin component comprised in the fiber-reinforced resin material also has a great influence on the efficiency of removing the resin component. For example, it is very difficult to dissolve an amine-cured epoxy resin in a treatment solution, and it is difficult to apply the solvent method. If reinforcing fibers can be recovered by the solvent method from a fiber-reinforced resin material comprising a resin component having a chemical structure with basic properties, such as an amine-cured epoxy resin, it becomes possible to recover reinforcing fibers from more fiber-reinforced resin materials.

Therefore, an object of the present invention is to provide a method of producing recycled reinforcing fibers capable of efficiently recovering reinforcing fibers, even with a solvent method, from a fiber-reinforced resin material comprising a resin component having a chemical structure with basic properties.

Solution to Problem

The inventors of the present invention have studied the recovery of reinforcing fibers from a fiber-reinforced resin material comprising a resin component having a chemical structure with basic properties (hereinafter, also simply referred to as a "basic structure"), and found that the resin component having a basic structure is efficiently dissolved in a solvent by swelling the fiber-reinforced resin material with an acidic solution and then oxidizing the resin component with an oxidizing agent.

The inventors of the present invention conducted further studies based on the above findings, and arrived at the present invention.

The gist of the present invention includes the following.

(1) A method of producing recycled reinforcing fibers, the method including:
   - a step of treating a fiber-reinforced resin material comprising a resin and reinforcing fibers with an acidic solution comprising an acid, and
   - a step of treating the fiber-reinforced resin material with a treatment solution comprising an oxidizing agent to dissolve at least part of the resin of the fiber-reinforced resin material in the treatment solution, wherein the resin comprises a resin component having a chemical structure with basic properties.

(2) The method of producing recycled reinforcing fibers according to (1), wherein a pKa of a component having the highest molar concentration among components comprised in the acid is 5.0 or less.

(3) The method of producing recycled reinforcing fibers according to (1) or (2), wherein the acid comprises at least one selected from the group consisting of sulfuric acid, hydrochloric acid, phosphoric acid and acetic acid.

(4) The method of producing recycled reinforcing fibers according to any one of (1) to (3), wherein the acid in the acidic solution has a concentration of 0.5 mol/L or more.

(5) The method of producing recycled reinforcing fibers according to any one of (1) to (4), wherein the oxidizing agent comprises an acid having oxidizing properties.

(6) The method of producing recycled reinforcing fibers according to any one of (1) to (5), wherein the acid having oxidizing properties comprises at least one selected from the group consisting of nitric acid, a mixed acid of sulfuric acid and nitric acid, a mixed acid of nitric acid and hydrochloric acid (aqua regia), and a mixed solution of hydrogen peroxide and sulfuric acid.

(7) The method of producing recycled reinforcing fibers according to any one of (1) to (6), wherein the resin component having a chemical structure with basic properties has the chemical structure with basic properties in a main chain structure.

(8) The method of producing recycled reinforcing fibers according to any one of (1) to (7), wherein the chemical structure with basic properties is a primary, secondary or tertiary amide bond.

Advantageous Effects of Invention

With the above configuration, it is possible to provide a method of producing recycled reinforcing fibers capable of efficiently recovering reinforcing fibers, even with a solvent method, from a fiber-reinforced resin material comprising a resin component having a chemical structure with basic properties.

DESCRIPTION OF EMBODIMENTS

An example of a method of producing recycled reinforcing fibers according to a preferred embodiment of the present invention w ill be described below. A method of producing recycled reinforcing fibers according to the present invention comprises: a step (acid treatment step) of treating a fiber-reinforced resin material comprising a resin and reinforcing fibers with an acidic solution comprising an acid; and a step (oxidation step) of treating the fiber-reinforced resin material with a treatment solution comprising an oxidizing agent to dissolve at least part of the resin of the fiber-reinforced resin material in the treatment solution, wherein the resin compress a resin component having a chemical structure with basic properties (basic structure). In the following description, each step in the method of producing recycled reinforcing fibers according to the present embodiment will be described.

2.1. Preparation Step

First, prior to the acid treatment step, a fiber-reinforced resin material is prepared. The fiber-reinforced resin material is a resin material reinforced by reinforcing fibers embedded in a matrix resin (also simply referred to as a "resin"). Examples of the fiber-reinforced resin material include, but are not limited to, carbon fiber reinforced plastics (CFRP), glass fiber reinforced plastics (GFRP), glass-mat reinforced thermoplastics (GMT), aramid-fiber-reinforced plastics (AFRP), Kevlar fiber reinforced plastics (KFRP), Dyneema fiber-reinforced plastics (DFRP), basalt fiber reinforced plastics, boron fiber reinforced plastics, and prepregs thereof. Among those described above, a relatively large amount of carbon fiber reinforced plastics is used and a large amount of energy is consumed in production of carbon fibers, so it is desired to recover carbon fibers from the used carbon fiber reinforced plastics and/or prepregs thereof and reuse them.

In addition, the reinforcing fibers in the fiber-reinforced resin material may be in the form of fiber bundles (tows) in which a plurality of reinforcing fibers are aligned in one direction, or in the form of a woven fabric or a non-woven fabric in which fiber bundles of reinforcing fibers are used as warp and weft, or the reinforcing fibers may be arranged at random positions and orientations. Further, the reinforcing fibers may be in the form of chips, and examples thereof include chopped fibers obtained by cutting fiber bundles, chips of a woven fabric, or the like.

In the present embodiment, the resin constituting the fiber-reinforced resin material comprises a resin component having a basic structure. The resin component having a basic structure can swell by coordinating hydrogen ions (protons) in an acidic solution in the acid treatment step described later. The swollen resin component having a basic structure enables sufficient permeation of an oxidizing agent in the oxidation step described later, which accelerates dissolution of the resin component in a treatment solution.

The basic structure of the resin component is not particularly limited, and examples thereof include an amide bond, an imide bond, an azo group, a diazo group, a urea bond, a urethane bond, a peptide bond, an isocyanate group, an azide group, and chemical structures derived from or similar to these. The resin component having a basic structure can comprise one or more of these. Among those described above, the method according to the present embodiment can be suitably used to swell and decompose a resin component having a primary, secondary or tertiary amide bond as a basic structure.

The resin component having a basic structure preferably comprises chemical bonds having basic properties in its main chain structure. Accordingly, in the acid treatment step, swelling can be further promoted by a reaction with a chemical structure having basic properties, and in the oxidation step described later, decomposition and subsequent dissolution of the resin component in the treatment solution can be accelerated. Examples of the resin component having a basic structure comprise amine-cured epoxy resins, urethane resins, polyimide resins, polyamide, melamine resins, aniline resins and urea resins. The resin can comprise one or more of these as the resin component.

The resin component having a basic structure may comprise a basic structure in its side chain. Examples of such a resin component include those having a basic structure as described above in a side chain of various resin components described later.

The content of the resin component having a basic structure in the resin in the fiber-reinforced resin material is not particularly limited, but may be, for example, 1 mass % or more, preferably 5 mass % or more, and more preferably 10 mass % or more. Still more preferably, the resin consists essentially of a resin component having a basic structure, and most preferably, the resin consists of a resin component having a basic structure. Accordingly, removal of the resin and recovery of the reinforcing fibers from the fiber-reinforced resin material are further facilitated.

Moreover, the resin in the fiber-reinforced resin material may comprise a resin component other than the resin component having a basic structure. Such a resin component is not particularly limited, and may be, for example, either a thermosetting resin or a thermoplastic resin. The thermosetting resin may be uncured or may be a cured product.

Examples of the thermosetting resin include, but are not limited to, epoxy resins, unsaturated polyester resins, vinyl ester resins, phenol resins, cyanate resins, polycarbonate resins and polyacetal resins, and these can be used singly or in combination of two or more.

Examples of the thermoplastic resin include, but are not limited to, polyolefins, polyesters, polycarbonates, acrylic resins, acrylonitrile-butadiene-styrene copolymers, polyether ketones, polyphenylene sulfides, and the like, and these can be used singly or in combination of two or more.

Further, the fiber-reinforced resin material may have a sheet shape, or may be in the form of cut chips. In particular, the method according to the present embodiment, which is capable of relatively efficiently removing the resin, can be suitably applied to sheet-shaped fiber-reinforced resin materials, from which it has been difficult to recover reinforcing fibers.

Further, the size of the fiber-reinforced resin material is not particularly limited. However, in consideration of maintaining the direction of the reinforcing fibers in the fiber-reinforced resin material, the length of each piece of the fiber-reinforced resin material may be, for example, 100 mm or more, and preferably 500 mm or more and 3,000 mm or less. More specifically, as the fiber-reinforced resin material, for example, a fiber-reinforced resin material sheet having a laminate thickness of approximately 300 mm and a size of 1,000 mm×500 mm can be used. In the fiber-reinforced resin material having a relatively large size as described above, the treatment solution tends not to readily permeate, making it difficult to remove the resin and recover the reinforcing fibers. However, the method according to the present embodiment, which is capable of relatively efficiently removing the resin, can also be applied to relatively large sized fiber-reinforced resin materials.

2.2. Acid Treatment Step

In this step, the prepared fiber-reinforced resin material is subjected to treatment with an acidic solution comprising an acid. By subjecting the fiber-reinforced resin material to treatment with an acidic solution comprising an acid, hydrogen ions in the acidic solution become coordinated in the resin component having a basic structure to form a salt, resulting in swelling of the resin component having a basic structure and thus swelling of the resin itself. This promotes permeation of the oxidizing agent into the resin in the oxidation step described later, and accelerates decomposition and elution of the resin in the oxidation step.

The acidic solution in this step comprises at least an acid and optionally a solvent. Examples of the acid include inorganic acids, organic acids, and mixtures thereof. Examples of the inorganic acids include sulfuric acid, hydrochloric acid and phosphoric acid, and these can be used singly or in combination of two or more. Examples of the phosphoric acid include orthophosphoric acid, metaphosphoric acid, hypophosphoric acid, phosphorous acid, hypophosphorous acid, pyrophosphoric acid, trimetaphosphoric acid, tetrametaphosphoric acid and pyrophosphorous acid. Examples of the organic acids include formic acid, acetic acid, citric acid, succinic acid and oxalic acid.

Among those described above, from the perspective of suitably swelling the resin component, the acid preferably comprises at least one selected from the group consisting of inorganic acids, especially sulfuric, hydrochloric and phosphoric acids, and acetic acid.

Further, the acid dissociation constant pKa of the component having the highest molar concentration among the components comprised in the acid is not particularly limited, but is preferably 5.0 or less, and more preferably 1.5 or less. Due to the pKa of the component having the highest molar concentration among the components comprised in the acid being sufficiently low, hydrogen ions are easily released into the acidic solution, resulting in efficient swelling of the resin component. When the component having the highest molar concentration among the components comprised in the acid has a plurality of acid dissociation constants, the acid dissociation constant at the first stage, that is, the lower acid dissociation constant, is preferably within the above range.

The concentration of the acid comprised in the acidic solution is not particularly limited, but may be, for example, 0.5 mol/L or more, preferably 1.0 mol/L or more, and more preferably 3.5 mol/L or more. Accordingly, hydrogen ions are easily released into the acidic solution, resulting in efficient swelling of the resin component. The upper limit of the acid concentration is not limited as long as it can provide an acidic solution, and varies depending on the type of the acid.

Further, the acidic solution typically comprises a solvent. The solvent is not particularly limited as long as it can be mixed with the acid described above and is chemically stable to the acid, and may be, for example, water and/or various organic solvents.

Examples of the organic solvents include, but are not limited to, alcohol-based solvents, ether-based solvents, ketone-based solvents, aromatic hydrocarbons, halogenated aromatic hydrocarbons, halogenated aliphatic hydrocarbons, and the like, and these can be used singly or in combination of two or more.

Examples of the alcohol-based solvents include aliphatic alcohol-based solvents, aromatic alcohol-based solvents, glycol-based solvents and other polyhydric alcohols such as glycerin.

Examples of the aliphatic alcohol-based solvents include acyclic aliphatic alcohols such as 1-butanol, 2-butanol, 2-methyl-1-propanol, 2-methyl-2-propanol, 1-pentanol, 2-pentanol, 3-pentanol, 2-methyl-1-butanol, 2-methyl-2-butanol, 3-methyl-1-butanol, 3-methyl-2-butanol, 2,2-dimethyl-1-propanol, 1-hexanol, 2-hexanol, 3-hexanol, 2-ethylhexanol, 2-methyl-1-pentanol, 4-methyl-2-pentanol, 2-ethyl-1-butanol, 1-heptanol, 2-heptanol, 3-heptanol, dodecanol, methanol and ethanol: and alicyclic alcohols such as cyclohexanol, 1-methylcyclohexanol, 2-methylcyclohexanol, 3-methylcyclohexanol and 4-methylcyclohexanol.

Examples of the aromatic alcohol-based solvents include phenol, cresol, benzyl alcohol and phenoxyethanol.

Examples of the glycol-based solvents include ethylene glycol, ethylene glycol monomethyl ether, ethylene glycol monoethyl ether, ethylene glycol monopropyl ether, ethylene glycol monobutyl ether, diethylene glycol, diethylene glycol monomethyl ether, diethylene glycol monoethyl ether, diethylene glycol monopropyl ether, diethylene glycol monobutyl ether, triethylene glycol, triethylene glycol monomethyl ether, triethylene glycol monoethyl ether, tetra ethylene glycol, polyethylene glycol (molecular weight 200 to 400), 1,2-propanedial, 1,3-propanediol, 1,2-butanediol, 1,3-butanediol, 1,4-butanediol, 2,3-butanediol, 1,5-pentanediol and dipropylene glycol.

Examples of the ether-based solvents include aliphatic ethers such as dimethyl ether, diethyl ether, ethyl methyl ether, dipropyl ether, diisopropyl ether, dibutyl ether and dihexyl ether; cyclic ethers such as 1,3-dioxolane, 1,4-dioxane, tetrahydrofuran and furan; and aromatic-comprising ethers such as anisole, phenetole, diphenyl ether and benzofuran.

Examples of the ketone-based solvents include acetone, methyl ethyl ketone, 2-pentanone, 3-pentanone, 2-hexanone, methyl isobutyl ketone, 2-heptanone, 4-heptanone, diisobutyl ketone, cyclohexanone, methylcyclohexanone, phorone, isophorone, acetylacetone, acetophenone, diethylketone and diacetone alcohol.

Examples of the aromatic hydrocarbons include benzene, toluene and xylene.

Examples of the halogenated aromatic hydrocarbons include orthochlorophenol and orthodichlorobenzene.

Examples of the halogenated aliphatic hydrocarbons include chloroform and methylene chloride.

Among those described above, the solvent preferably comprises water in order to facilitate mixture with the acid and appropriately dissociate hydrogen ions in the acid. The solvent may be a mixed solvent of water and an organic solvent miscible with water. Examples of the organic solvent miscible with water include alcohol-based solvents and ketone-based solvents.

The solvent content in the acidic solution is not particularly limited, and may be the balance of other components such as the acid.

The fiber-reinforced resin material is subjected to treatment with the acidic solution as described above. The temperature of the acidic solution during treatment is not particularly limited, and may be, for example, 0° C. or more and 100° C. or less, and preferably 50° C. or more and 100° C. or less.

The treatment time with the acidic solution is not particularly limited, and may be 5 minutes or more and 1,200 minutes or less, and preferably 10 minutes or more and 120 minutes or less after the target temperature is reached.

In addition, treatment with the acidic solution may be performed under normal pressure, reduced pressure, or increased pressure. When the treatment with the acidic solution is performed under increased pressure, the pressure may be, for example, 0.11 MPa or more and 7.0 MPa or less, and especially 0.11 MPa or more and 2.0 MPa or less. In consideration of safety and economy, the treatment with the acidic solution is preferably performed under normal pressure.

The treatment of the fiber-reinforced resin material with the acidic solution is not particularly limited, and may be performed by immersing the fiber-reinforced resin material in the acidic solution, or may be performed by spraying the acidic solution to the fiber-reinforced resin material with a spray or the like, and any means capable of bringing the acidic solution into contact with the fiber-reinforced resin material can be used. Further, the acidic solution may be agitated during treatment with the acidic solution. In addition, the fiber-reinforced resin material may be secured by a fixture so that the fiber bundles of the fiber-reinforced resin material are maintained.

While the resin in the fiber-reinforced resin material swells in this step, part of the resin may be decomposed and/or dissolved in the acidic solution.

2.3. Oxidation Step

In this step, the fiber-reinforced resin material is subjected to treatment with a treatment solution comprising an oxidizing agent by subjecting the fiber-reinforced resin material comprising the resin swollen by the acidic solution to treatment with the oxidizing agent to dissolve at least part of the resin of the fiber-reinforced resin material in the treatment solution. The fiber-reinforced resin material comprising the resin swollen by the acidic solution promotes permeation of the oxidizing agent into the resin, and as a result, the resin is efficiently decomposed and eluted by the oxidizing agent in this step.

The treatment solution in this step comprises at least an oxidizing agent and optionally a solvent. Examples of the oxidizing agent include, but are not limited to, acids having oxidizing properties, such as nitric acid, hot concentrated sulfuric acid, a mixed acid of sulfuric acid and nitric acid, a mixed acid of nitric acid and hydrochloric acid (aqua regia), a mixed solution of hydrogen peroxide and sulfuric acid, perchloric acid, chloric acid, hypochlorous acid, chlorous acid, perbromic acid, bromic acid, hypobromous acid, bromous acid, periodic acid, iodic acid, hypoiodous acid and iodous acid, alkali (earth) metal salts thereof, oxygen-based oxidizing agents, such as oxygen, ozone, hydrogen peroxide and acetone peroxide (reaction product of hydrogen peroxide and acetone), halogen-based oxidizing agents, such as chlorine, chlorine dioxide, bromine, fluorine and iodine, and the like, and these can be used singly or in combination of two or more. Further, examples of the alkali metal elements include lithium, sodium, potassium, rubidium, cesium and francium, and examples of the alkali earth metals include calcium, strontium, barium and radium.

Among those described above, the oxidizing agent preferably comprise an acid having oxidizing properties since it is relatively easy to handle and can stabilize the liquid properties of the treatment solution. In particular, from the viewpoint of the efficiency of decomposition of the resin component, the oxidizing agent more preferably comprises at least one selected from the group consisting of nitric acid, a mixed acid of sulfuric acid and nitric acid, a mixed acid of nitric acid and hydrochloric acid (aqua regia), and a mixed solution of hydrogen peroxide and sulfuric acid, and particularly preferably comprises nitric acid or a mixed solution of hydrogen peroxide and sulfuric acid.

The concentration of the oxidizing agent in the treatment solution is not particularly limited, and can be appropriately set according to the amount of the resin component in the fiber-reinforced resin material to be treated. However, when the oxidizing agent is an acid having oxidizing properties, the concentration of the oxidizing agent in the treatment solution may be, for example, 5 mass % or more and 80 mass % or less, and preferably 20 mass % or more and 50 mass % or less.

Further, the treatment solution typically comprises a solvent. The solvent is not particularly limited as long as it is stable to the oxidizing agent to be used, and for example, water and various organic solvents exemplified as the solvent of the treatment solution described above can be used singly or in combination of two or more.

In particular, the solvent in the treatment solution preferably comprises water or an organic solvent comprised in the solvent of the acidic solution described above. When the acidic solution comprises a plurality of solvents, the treatment solution preferably comprises one or more of the plurality of solvents. Accordingly, when the treatment solution is brought into contact with the fiber-reinforced resin material, occurrence of undesired side reactions or undesired shrinkage of the swollen fiber-reinforced resin material can be more reliably suppressed.

Further, from the viewpoint of ease of handling and acceleration of the oxidation reaction by the oxidizing agent, the treatment solution preferably comprises water or a mixed solvent of water and an organic solvent miscible with water, and more preferably comprises water.

Further, the treatment solution is preferably neutral or acidic, and is more preferably acidic. Accordingly, when the treatment solution is brought into contact with the fiber-reinforced resin material, the fiber-reinforced resin material swollen by the acidic solution is prevented from being neutralized and undesirably shrunk.

Specifically, the pH of the treatment solution at 25° C. may be, for example, 5.0 or less, preferably 2.0 or less, and more preferably 1.5 or less.

The content of the solvent comprised in the treatment solution is not particularly limited, and may be the balance of other components such as the oxidizing agent.

The fiber-reinforced resin material is subjected to treatment with the treatment solution as described above. The temperature of the treatment solution during treatment is not particularly limited, and may be, for example, 0° C. or more and 100° C. or less, and preferably 50° C. or more and 100° C. or less.

The treatment time with the treatment solution is not particularly limited, and may be 5 minutes or more and 1,200 minutes or less, and preferably 10 minutes or more and 120 minutes or less after the target temperature is reached.

In addition, the treatment with the treatment solution may be performed under normal pressure, reduced pressure, or increased pressure. When the treatment with the treatment solution is performed under increased pressure, the pressure may be, for example, 0.11 MPa or more and 7.0 MPa or less, and especially 0.11 MPa or more and 2.0 MPa or less. In consideration of safety and economy, the treatment with the treatment solution is preferably performed under normal pressure.

The treatment of the fiber-reinforced resin material with the treatment solution is not particularly limited, and may be performed by immersing the fiber-reinforced resin material in the treatment solution, or may be performed by spraying the treatment solution to the fiber-reinforced resin material with a spray or the like, and any means capable of bringing the treatment solution into contact with the fiber-reinforced resin material can be used. Further, the treatment solution may be agitated during treatment with the treatment solution. In addition, the fiber-reinforced resin material may be secured by a fixture so that the fiber bundles of the fiber-reinforced resin material are maintained.

2.4. Washing Step

Next, washing is performed as necessary. Washing can be performed by bringing a cleaning solution into contact with the fiber-reinforced resin material. Specifically, washing can be performed by replacing the treatment solution with a cleaning solution in the above oxidation step. The temperature of the cleaning solution and the washing time during washing can be appropriately set.

Examples of the cleaning solution include water and various organic solvents exemplified as the solvent of the treatment solution described above, and these can be used singly or in combination of two or more. Further, examples of the organic solvents include, in addition to the solvents described above, ester-based solvents and amide-based solvents.

Examples of the ester-based solvents include methyl formate, ethyl formate, propyl formate, butyl formate, isobutyl formate, pentyl formate, methyl acetate, ethyl acetate, propyl acetate, isopropyl acetate, butyl acetate, isobutyl acetate, pentyl acetate, isopentyl acetate, 3-methoxybutyl acetate, 2-ethylbutyl acetate, 2-ethylhexyl acetate, cyclohexyl acetate, benzyl acetate, methyl propionate, ethyl propionate, butyl propionate, isopentyl propionate, methyl lactate, ethyl lactate, butyl lactate, methyl butyrate, ethyl butyrate, butyl butyrate, isopentyl butyrate, isobutyl isobutyrate, ethyl isovalerate, isopentyl isovalerate, methyl benzoate, ethyl benzoate, propyl benzoate, butyl benzoate, γ-butyrolactone, diethyl oxalate, dibutyl oxalate, diethyl malonate, methyl salicylate, ethylene glycol diacetate, tributyl borate, trimethyl phosphate and triethyl phosphate.

Examples of the amide-based solvents include formamide, N-methylformamide. N,N-dimethylformamide, N,N-diethylformamide, acetamide, N-methylacetamide, N,N-dimethylacetamide, 2-pyrrolidone, N-methyl-2-pyrrolidone, caprolactam and carbamic acid ester.

The cleaning solution may comprise a basic substance. The basic substance can be used to neutralize and adjust the liquid properties so that a resin component remaining in the fiber-reinforced resin material and a reaction product thereof can be removed.

Examples of the basic substances include inorganic basic substances such as hydroxides, carbonates, hydrogen carbonates, sulfates, sulfites and nitrates of lithium, alkali metals and alkaline earth metals: and amine compounds such as dimethylamine and diethylamine, and these can be used singly or in combination of two or more. Examples of the alkali metals include sodium, potassium, cesium and rubidium. Examples of the alkaline earth metals include beryllium, magnesium, calcium, strontium and barium.

Each of the acid treatment step, oxidation step and washing step described above can be performed multiple times as necessary. For example, after the acid treatment step and oxidation step are repeated multiple times, the washing step may be performed. Alternatively, for example, after the acid treatment step is performed multiple times, the oxidation step may be performed, and then the washing step may be performed a required number of times. Alternatively, for example, the acid treatment step, oxidation step and washing step may be performed in this order a required number of times.

2.5. Drying Step

After the resin component is dissolved and removed from the fiber-reinforced resin material as described above, the fiber-reinforced resin material may be dried. Drying may be performed, for example, by bringing the fiber-reinforced resin material into contact with a gas. The gas to be contacted is not particularly limited, but is preferably air or an inert gas such as nitrogen from the view point of safety.

Further, during drying, the gas to be contacted may be heated. This accelerates drying. The temperature of the gas during heating may be, for example, 0° C. or more and 400° C. or less, and preferably 80° C. or more and 110° C. or less.

Drying may be performed while fixing the fiber-reinforced resin material as necessary. Accordingly, it is possible to dry the reinforcing fibers while maintaining the shape and orientation of the reinforcing fibers comprised in the fiber-reinforced resin material 100.

Thus, recycled reinforcing fibers can be obtained. In the method of producing recycled reinforcing fibers according to the present embodiment, a fiber-reinforced resin material comprising a resin comprising a resin component having a basic structure is treated with an acidic solution to swell the resin. Then, the fiber-reinforced resin material comprising the swollen resin is treated with a treatment solution comprising an oxidizing agent to dissolve at least part of the resin of the fiber-reinforced resin material in the treatment solution. The fiber-reinforced resin material comprising the resin swollen by the acidic solution promotes permeation of the oxidizing agent into the resin, and as a result, the resin is efficiently decomposed by the oxidizing agent and eluted into the treatment solution.

Thus, according to the present embodiment, it is possible to efficiently recover reinforcing fibers from a fiber-reinforced resin material comprising a resin component having a basic structure, even with a solvent method. In particular, according to the present embodiment, it is possible to recover reinforcing fibers from a fiber-reinforced resin material comprising a resin such as an amine-cured epoxy resin, which has previously been difficult to remove. Furthermore, according to the present embodiment, which is capable of relatively efficiently removing the resin, it is not necessary to finely cut the fiber-reinforced resin material before dissolving the resin, unlike the conventional technique. That is, the method according to the present embodiment can be applied to a relatively large sized fiber-reinforced resin material, whereby the resin can be swollen by the acid to promote permeation of the oxidizing agent into the resin, so that the resin can be removed uniformly and efficiently.

The resin dissolved in the acidic solution or the treatment solution may also be recovered and recycled.

EXAMPLES

The present invention will be described in more detail using the examples, but the present invention is not limited to these examples.

1. Production of Recycled Reinforcing Fibers

Example 1

(i) Preparation Step

First, a carbon fiber reinforced resin material was prepared as a sample. The carbon fiber resin material used was a sheet with a length of approximately 30 cm, a width of 5 cm and a thickness of approximately 1 mm. Further, the resin constituting the carbon fiber reinforced resin material was an amine-cured epoxy resin.

(ii) Acid Treatment Step

Next, the carbon fiber reinforced resin material was immersed for 1 hour in a 40 wt % (5.3 mol/L) sulfuric acid aqueous solution heated to 80° C. During the immersion, the temperature of the sulfuric acid aqueous solution was maintained at 80° C.

(iii) Oxidation Step

Next, the carbon fiber reinforced resin material was immersed for 60 minutes in a 40 wt % (8.0 mol/L) nitric acid aqueous solution heated to 80° C. During the immersion, the temperature of the nitric acid aqueous solution was maintained at 80° C.

(iv) Washing Step

Next, the reaction product was washed with N-methyl-2-pyrrolidone, and neutralized with a 20 mass % sodium hydrogen carbonate aqueous solution, and then carbon fibers in the carbon fiber reinforced resin material were recovered to obtain recycled carbon fibers according to Example 1.

Example 2

Recycled carbon fibers according to Example 2 were obtained in the same manner as in Example 1 except that the reaction product was neutralized and washed with a 10 mass % sodium hydroxide aqueous solution (2.8 mol/L) in the washing step.

Example 3

Recycled carbon fibers according to Example 3 were obtained in the same manner as in Example 1 except that the oxidation step was performed as follows.

In the oxidation step, treatment with a mixed solution of hydrogen peroxide and sulfuric acid was performed. Specifically, the carbon fiber reinforced resin material after the acid treatment step was immersed for 15 minutes in a 95 wt % (18.0 mol/L) sulfuric acid aqueous solution heated to 80° C., and then, a 35 wt % (11.6 mol/L) hydrogen peroxide aqueous solution corresponding to 10 volume % of the sulfuric acid was added dropwise for 5 minutes to the sulfuric acid aqueous solution in which the carbon fiber reinforced resin material was immersed.

Example 4

Recycled carbon fibers according to Example 4 were obtained in the same manner as in Example 3 except that the reaction product was neutralized and washed with a 10 mass % sodium hydroxide aqueous solution (2.8 mol/L) in the washing step.

Example 5

Recycled carbon fibers according to Example 5 were obtained in the same manner as in Example 3 except that a 35 wt % (11.3 mol/L) hydrochloric acid aqueous solution was used instead of the 40 wt % (5.3 mol/L) sulfuric acid aqueous solution in the acid treatment step.

Example 6

Recycled carbon fibers according to Example 6 were obtained in the same manner as in Example 4 except that a 35 wt % (11.3 mol/L) hydrochloric acid aqueous solution was used instead of the 40 wt % (5.3 mol/L) sulfuric acid aqueous solution in the acid treatment step.

Example 7

Recycled carbon fibers according to Example 5 were obtained in the same manner as in Example 3 except that a 40 wt % (5.1 mol/L) phosphoric acid aqueous solution was used instead of the 40 wt % (5.3 mol/L) sulfuric acid aqueous solution in the acid treatment step.

Example 8

Recycled carbon fibers according to Example 6 were obtained in the same manner as in Example 4 except that a 40 wt % (5.1 mol/L) phosphoric acid aqueous solution was used instead of the 40 wt % (5.3 mol/L) sulfuric acid aqueous solution in the acid treatment step.

Comparative Example 1

Recycled carbon fibers according to Comparative Example 1 were obtained in the same manner as in Example 1 except that the acid treatment step was omitted and the carbon fiber reinforced resin material was immersed in the sulfuric acid aqueous solution for 120 minutes in the oxidation step.

Comparative Example 2

Recycled carbon fibers according to Comparative Example 2 were obtained in the same manner as in Example 2 except that the acid treatment step was omitted and the carbon fiber reinforced resin material was immersed in the sulfuric acid aqueous solution for 120 minutes in the oxidation step.

Comparative Example 3

Recycled carbon fibers according to Comparative Example 3 were obtained in the same manner as in Example 3 except that the acid treatment step was omitted.

Comparative Example 4

Recycled carbon fibers according to Comparative Example 4 were obtained in the same manner as in Example 4 except that the acid treatment step was omitted.

2. Evaluation of Recycled Reinforcing Fibers

For the obtained recycled carbon fibers according to Examples 1 to 8 and Comparative Examples 1 to 4, the amount of residual resin was calculated by thermogravimetric analysis (TGA). Specifically, first, the recycled carbon fibers according to Examples 1 to 8 and Comparative Examples 1 to 4 were heated at a temperature increase rate of 10° C./min while applying nitrogen gas at a flow rate of 300 m/min to measure a decrease in weight of the recycled carbon fibers from 200° C. to 800° C. Next, in consideration of a weight loss of the carbon fibers in the thermogravimetric analysis, it was confirmed in advance that there was no weight loss of new carbon fibers under the same conditions. The amount of residual resin was measured three times, and the average thereof was taken as the amount of residual resin of the recycled carbon fibers according to Examples 1 to 8 and Comparative Examples 1 to 4. The amount of resin in the untreated carbon fiber reinforcement resin material was 31.2 wt %. Table 1 shows the results with the experimental conditions.

TABLE 1

| | Acid treatment step | | | Oxidation step | | | Washing step | | Amount of residual resin (wt %) |
|---|---|---|---|---|---|---|---|---|---|
| | Acidic solution | Treatment temp. (° C.) | Immersion time (min) | Treatment solution | Treatment temp. (° C.) | Immersion time (min) | Type of treatment solution: First stage | Type of treatment solution: Second stage | |
| Ex. 1 | 5.3 mol/L sulfuric acid aqueous solution | 80 | 60 | 8.0 mol/L nitric acid aqueous solution | 80 | 60 | N-methyl-2-pyrrolidone | Sodium hydrogen carbonate aqueous solution | 1.96 |
| Ex. 2 | 5.3 mol/L sulfuric acid aqueous solution | 80 | 60 | 8.0 mol/L nitric acid aqueous solution | 80 | 60 | Sodium hydroxide aqueous solution | — | 1.48 |
| Ex. 3 | 5.3 mol/L sulfuric acid aqueous solution | 80 | 60 | After treatment with 18.0 mol/L sulfuric acid aqueous solution at 80° C. for 15 minutes, 11.6 mol/L hydrogen peroxide aqueous solution corresponding to 10 volume % of the sulfuric acid was added dropwise for 5 minutes | | | N-methyl-2-pyrrolidone | Sodium hydrogen carbonate aqueous solution | 0.02 |
| Ex. 4 | 5.3 mol/L sulfuric acid aqueous solution | 80 | 60 | | | | Sodium hydroxide aqueous solution | — | 0.05 |
| Ex. 5 | 11.3 mol/L hydrochloric acid aqueous solution | 80 | 60 | | | | N-methyl-2-pyrrolidone | Sodium hydrogen carbonate aqueous solution | 0.23 |
| Ex. 6 | 11.3 mol/L hydrochloric acid aqueous solution | 80 | 60 | | | | Sodium hydroxide aqueous solution | — | 0.83 |
| Ex. 7 | 5.1 mol/L phosphoric acid aqueous solution | 80 | 60 | | | | N-methyl-2-pyrrolidone | Sodium hydrogen carbonate aqueous solution | 0.28 |
| Ex. 8 | 5.1 mol/L phosphoric acid aqueous solution | 80 | 60 | | | | Sodium hydroxide aqueous solution | — | 0.01 |
| Comp. Ex. 1 | — | — | — | 8.0 mol/L nitric acid aqueous solution | 80 | 120 | N-methyl-2-pyrrolidone | Sodium hydrogen carbonate aqueous solution | 4.24 |
| Comp. Ex. 2 | — | — | — | 8.0 mol/L nitric acid aqueous solution | 80 | 120 | Sodium hydroxide aqueous solution | — | 2.42 |
| Comp. Ex. 3 | — | — | — | After treatment with 18.0 mol/L sulfuric acid aqueous solution at 80° C. for 15 minutes, 11.6 mol/L hydrogen peroxide aqueous solution corresponding to 10 volume % of the sulfuric acid was added dropwise for 5 minutes | | | N-methyl-2-pyrrolidone | Sodium hydrogen carbonate aqueous solution | 0.45 |
| Comp. Ex. 4 | — | — | — | | | | Sodium hydroxide aqueous solution | — | 2.76 |

As shown in Table 1, the resin was found to be efficiently removed from the carbon fiber reinforced resin material in Examples 1 to 8. Specifically, the recycled carbon fibers in Example 1 had the amount of residual resin significantly smaller than that in Comparative Example 1, the recycled carbon fibers in Example 2 had the amount of residual resin significantly smaller than that in Comparative Example 2, the recycled carbon fibers in Examples 3, 5 and 7 had the amount of residual resin significantly smaller than that in Comparative Example 3, and the recycled carbon fibers in Examples 4, 6 and 8 had the amount of residual resin significantly smaller than that in Comparative Example 4. As seen from the above, by combining the acid treatment step and the oxidation step, the resin component having a chemical structure with basic properties can be efficiently removed from the carbon fiber reinforced resin material.

The amount of residual resin was significantly different between the recycled carbon fibers according to Example 1 and the recycled carbon fibers according to Comparative Example 1. Comparing Example 1 and Comparative Example 1 in the washing step, the cleaning solution penetrated inside the reaction product in Example 1, whereas unreacted portions (hard portions) were found inside the reaction product after the first stage of the washing step in Comparative Example 1. This is considered to be an effect of the oxidation step being uniformly performed on the interior due to swelling of the resin by the acid treatment step. The unreacted portions remained after the second stage of the washing step, and the permeability of the cleaning solution was considered to be poor.

In addition, the difference in the amount of residual resin between Example 2 and Comparative Example 2 was not as large as that between Example 1 and Comparative Example 1. The reason for this seems to be that the neutralization reaction of the resin component easily proceeded since both the acid treatment step and the oxidation step used an acidic aqueous solution.

Furthermore, although the carbon fiber reinforced resin material used as a sample had relatively large size, the resin component could be sufficiently removed in Examples 1 to 8.

Although the preferred embodiments of the present invention have been described in detail with reference to the accompanying drawings, the present invention is not limited to these examples. It is obvious that a person skilled in the art can conceive of various alterations or modifications within the scope of technical idea recited in the claims, and these should be construed as being within the technical scope of the present invention.

The invention claimed is:

1. A method of producing recycled reinforcing fibers, the method comprising:

treating a fiber-reinforced resin material comprising a resin and reinforcing fibers with an acidic solution comprising an inorganic acid and water; and treating the fiber-reinforced resin material with a treatment solution comprising an oxidizing agent to dissolve at least part of the resin of the fiber-reinforced resin material in the treatment solution, wherein the resin comprises a resin component having a chemical structure with basic properties, and the oxidizing agent consists of one or more selected from the group consisting of nitric acid, concentrated sulfuric acid, a mixed acid of sulfuric acid and nitric acid, a mixed acid of nitric acid and hydrochloric acid, a mixed solution of hydrogen peroxide and sulfuric acid, oxygen based oxidizing agents, chlorine, chlorine dioxide, bromine, fluorine and iodine.

2. The method of producing recycled reinforcing fibers according to claim 1, wherein a pKa of a component having the highest molar concentration among components comprised in the inorganic acid is 5.0 or less.

3. The method of producing recycled reinforcing fibers according to claim 1, wherein the inorganic acid comprises at least one selected from the group consisting of sulfuric acid, hydrochloric acid, and phosphoric acid.

4. The method of producing recycled reinforcing fibers according to claim 1, wherein the inorganic acid in the acidic solution has a concentration of 0.5 mol/L or more.

5. The method of producing recycled reinforcing fibers according to claim 1, wherein the oxidizing agent comprises an acid having oxidizing properties.

6. The method of producing recycled reinforcing fibers according to claim 5, wherein the acid having oxidizing properties comprises at least one selected from the group consisting of nitric acid, a mixed acid of sulfuric acid and nitric acid, a mixed acid of nitric acid and hydrochloric acid (aqua regia), and a mixed solution of hydrogen peroxide and sulfuric acid.

7. The method of producing recycled reinforcing fibers according to claim 1, wherein the resin component having a chemical structure with basic properties has the chemical structure with basic properties in a main chain structure.

8. The method of producing recycled reinforcing fibers according to claim 1, wherein the chemical structure with basic properties is a primary, secondary or tertiary amide bond.

* * * * *